United States Patent [19]

Roos

[11] Patent Number: 5,006,020

[45] Date of Patent: Apr. 9, 1991

[54] CUTTER INSERT FOR MACHINING

[75] Inventor: Erwin Roos, Plochingen, Fed. Rep. of Germany

[73] Assignee: Feldmuehle Aktiengesellschaft, Düsseldorf, Fed. Rep. of Germany

[21] Appl. No.: 376,354

[22] Filed: Jul. 6, 1989

[30] Foreign Application Priority Data

Jul. 8, 1988 [DE] Fed. Rep. of Germany ....... 3823199

[51] Int. Cl.⁵ ............................................... B23P 15/28
[52] U.S. Cl. ..................................... 407/113; 407/120
[58] Field of Search ........................ 407/113, 114–116, 407/119, 120

[56] References Cited

U.S. PATENT DOCUMENTS

| | | | |
|---|---|---|---|
| 3,395,434 | 8/1968 | Wirfelt | 407/114 |
| 4,124,326 | 11/1978 | Cost | 407/114 |
| 4,312,250 | 1/1982 | Yankoff | 407/114 |
| 4,318,318 | 3/1982 | Schott | 407/114 |
| 4,616,963 | 10/1986 | Habert et al. | 407/114 |

*Primary Examiner*—Frederick R. Schmidt
*Assistant Examiner*—Lawrence Cruz
*Attorney, Agent, or Firm*—Felfe & Lynch

[57] ABSTRACT

Cutter inserts are provided with a circumferential primary bevel whose width is between 0.05 to 0.2 mm and which has an angle of inclination downward from the top surface of between 20 and 35 degrees. The primary bevel is adjoined by a secondary bevel which has a width between 0.5 and 2.0 mm and an inclination downward from the top surface between 5 and 15 degrees. The primary bevel is at an angle $\alpha$ between 5 and 15 degrees with respect to the secondary bevel. At the corner radii the secondary bevel comes to an end and thereby forms the strengthened area.

4 Claims, 3 Drawing Sheets

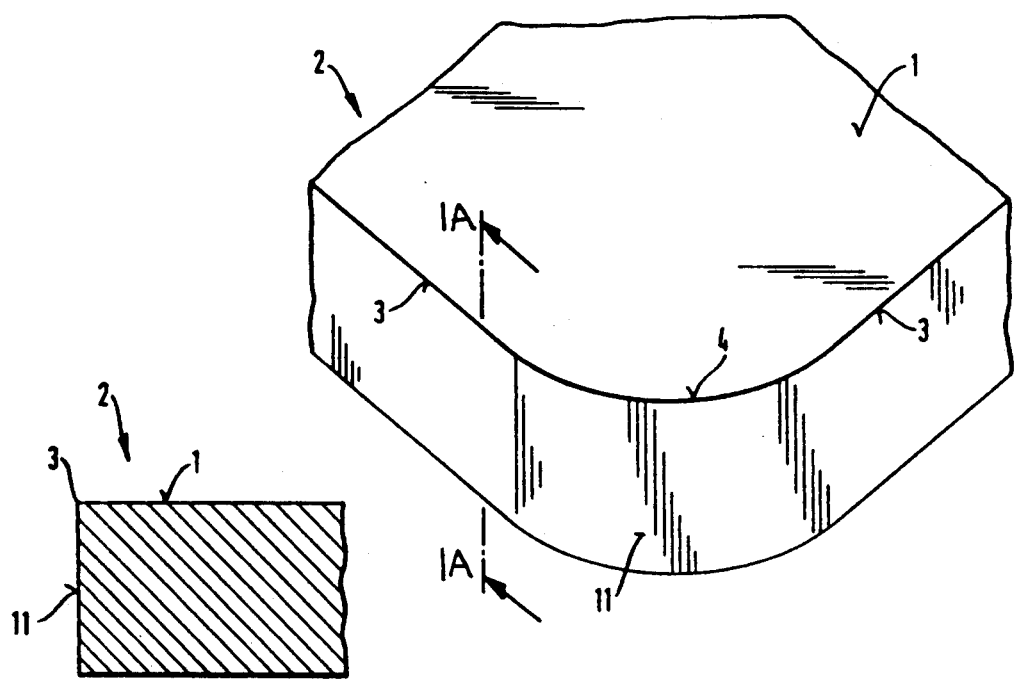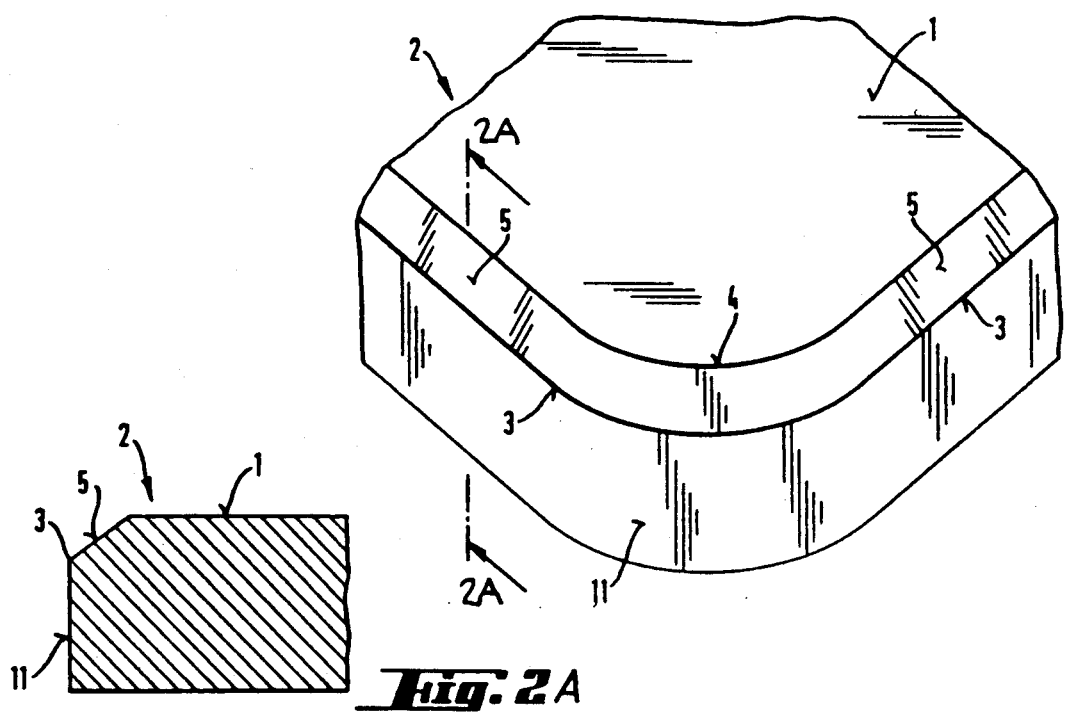

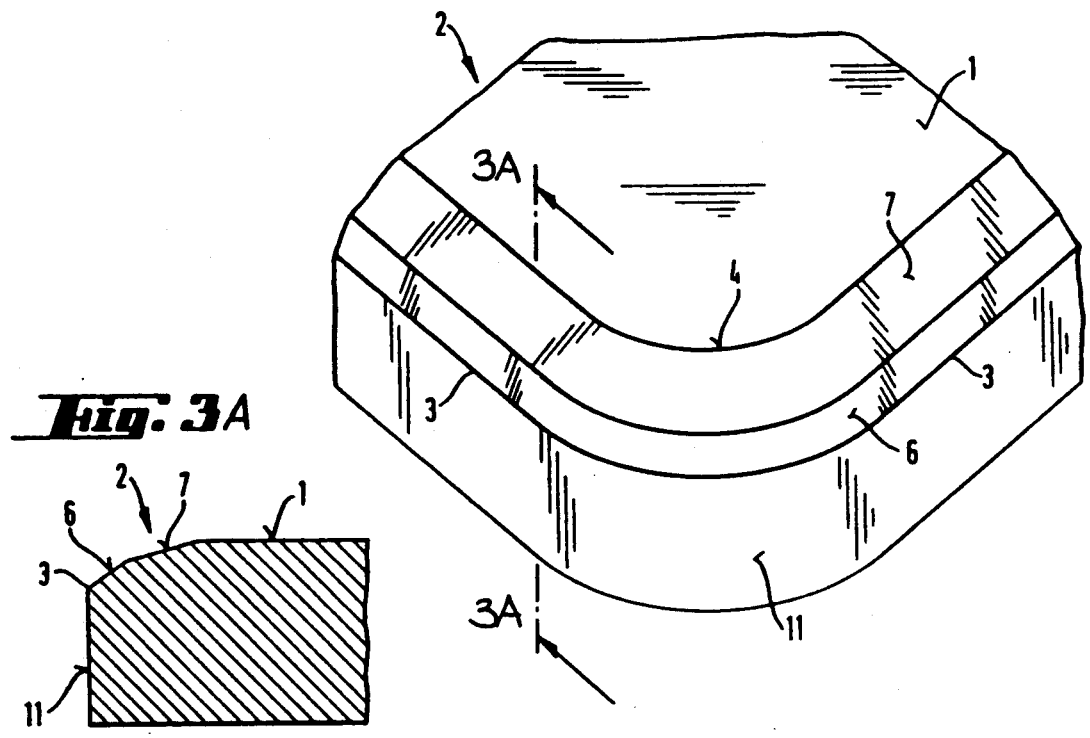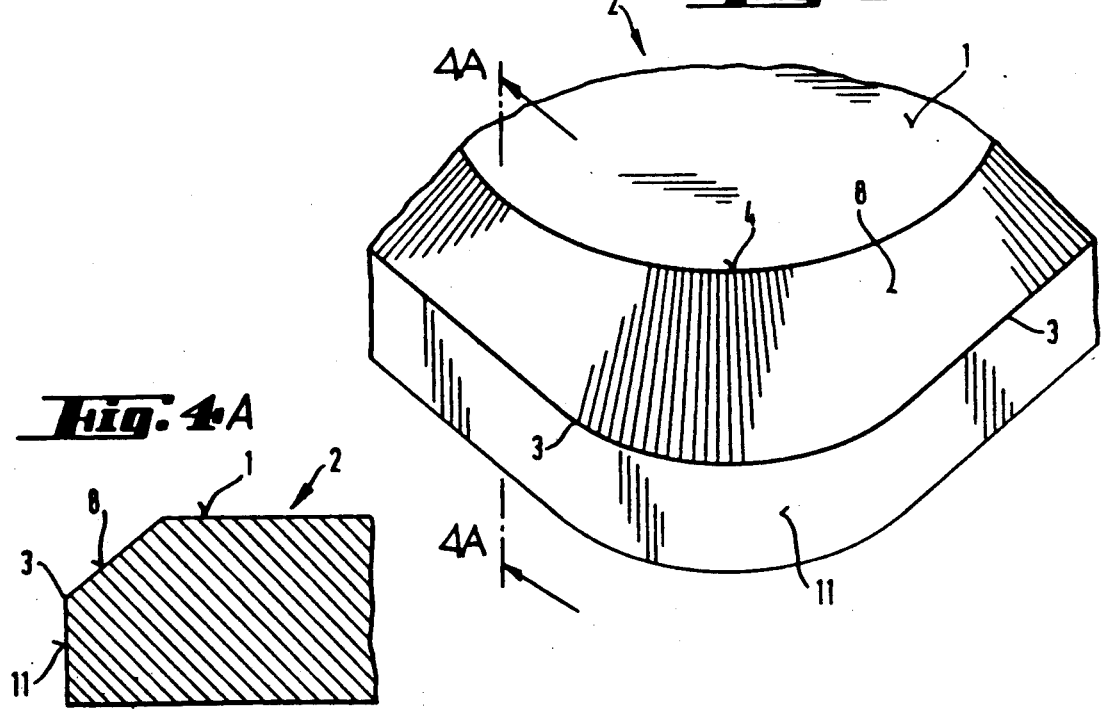

CUTTER INSERT FOR MACHINING

The invention relates to a cutter insert for machining, especially a polygonal rotatable cutter insert with rounded cutting corners and a protective bevel in the form of a double bevel running along the cutting edges.

Conventional rotatable cutter inserts have heretofore been used with four different cutting edge geometries. They can be square-edged, which is decidly rare in the case of ceramic rotatable cutter inserts, because this square edge is very delicate. They can also have a single circumferential protective bevel or a double bevel. Certain designs furthermore have a so-called TSD bevel, one which is in the form of a truncated cone in the area of the corner radius.

The purpose of the circumferential bevel is to prevent breakouts on rotatable cutter inserts of ceramic or other hard substances and thus prevent the destruction of the inserts. The disadvantage of the bevels, especially double bevels, is that the blunting of the cutting edge results in greater stress on the insert, which can lead to breakouts in the area of the corners.

It is therefore the purpose of the invention to strengthen the corner radius area of a cutter insert consisting of hard substances such that the danger of breakouts or fractures will be largely prevented.

In a cutter insert of the general kind involved, this is accomplished by the combination of the features recited in claim 1. The combination of the angle and width of the primary and secondary bevel already results in a very stable cutting edge geometry which offers substantially greater safety against edge breeakouts than a single protective bevel. At the same time the cutting performance of the insert is improved over that of a single bevel, i.e., the cutting forces are reduced by the angle combination in conjunction with the bevels described. The passive forces in the area of the cutter insert are therefore reduced. At the same time the corner radius area, which is subject to very high stress, is stabilized in accordance with the invention.

The cutter insert in accordance with the invention can advantageously be hot-pressed, and after that can be provided with a primary bevel and then with a secondary bevel. This method of production is especially advantageous when ceramics, such as silicon nitride, are used and the shape of the mold must be kept simple. If aluminum oxide is used as the material of the cutter inserts, a method is preferred in which the circumferential primary bevel is pressed right on the compact and the sintering is not performed until after that. The secondary bevel is then created at a later time by grinding.

Regardless of how the primary bevel has been created on the cutter insert, an especially preferred method of creating the secondary bevel is to be seen in the fact that the grinding of the secondary bevel is performed on a revolving grinding table. In this case the inserts are disposed along the periphery. Thus one cutting edge of a cutter insert forms a tangent to the circle which has substantially the diameter of the turntable of the grinding machine. The turntable rotates, while at the same time a grinding wheel is engaged with one cutting edge of one cutter insert, so that a secondary bevel is ground on the latter, which is wider in the area of the corners of the cutting edge than at the middle of the cutting edge. When the desired secondary bevel width is reached after several rotations of the turntable, the individual cutter inserts are rotated so that another, still-untreated cutting edge will then be at the location previously assumed by the one just finished. This procedure is repeated until all cutting edges have been provided with a secondary bevel, i.e., if the cutter inserts are rotatable cutter inserts they have to be turned and after that they must again be rotated by one cutting edge.

One desirable embodiment of this method provided that the cutter inserts be disposed at an angle $\beta$ to the turntable and the grinding wheel is carried parallel to the surface of the turntable. The angle $\beta$ amounts preferably to 5 to 15 degrees. On the cutter inserts the result will therefore be an angle which is also between 5 and 15 degrees. The angle $\gamma$ thus will be between 10 and 20 degrees. Furthermore, the result will be that the secondary bevel will continually decrease in width from the tip of the insert to the middle of the cutting edges.

Another preferred embodiment of the invention provides that the transitions between bevels are rounded.

In accordance with the invention, a cutter insert for machining, especially a polygonal rotatable cutter insert with rounded cutter corners and a protective bevel configured as a double bevel running along the cutting edge, comprises a body having a top surface and a corner radius and having a double bevel comprising primary bevel with a width of between 0.05 and 0.5 mm and an inclination $\alpha$ from the top surface between 20 and 35 degrees, and a secondary bevel with a width between 0.5 and 3.0 mm and an inclination $\beta$ from the top surface of 5 degrees to 15 degrees. The primary and secondary bevels are at an angle $\gamma$ to one another, the secondary bevel terminating in the area of the corner radius in a strengthening area formed exclusively by the primary bevel.

Also in accordance with the invention, a method for making cutter inserts for machining, especially polygonal rotatable cutter inserts with rounded cutting corners and a protective bevel running along the cutting edge configured as a double bevel, comprises hot-pressing a prismatic body from a ceramic composition, and after that grinding a secondary bevel along the top surfaces of the prismatic body.

For a better understanding of the invention, together with other and further objects thereof, reference is made to the following description, taken in connection with the accompanying drawings, and its scope will be pointed out in the appended claims.

The invention will be explained below with the aid of the drawings, wherein FIGS. 1 to 4 represent the state of the art.

FIG. 1 shows a sharp-edged cutter insert,

FIG. 1A shows the cutter insert in section,

FIG. 2 represents a cutter insert with a single circumferential bevel,

FIG. 2A represents this cutter insert in section,

FIG. 3 represents a cutter insert with a circumferential double bevel,

FIG. 3A represents a section through the insert,

FIG. 4 represents a TSD level,

FIG. 4A represents a section through FIG. 4,

Figure 5:
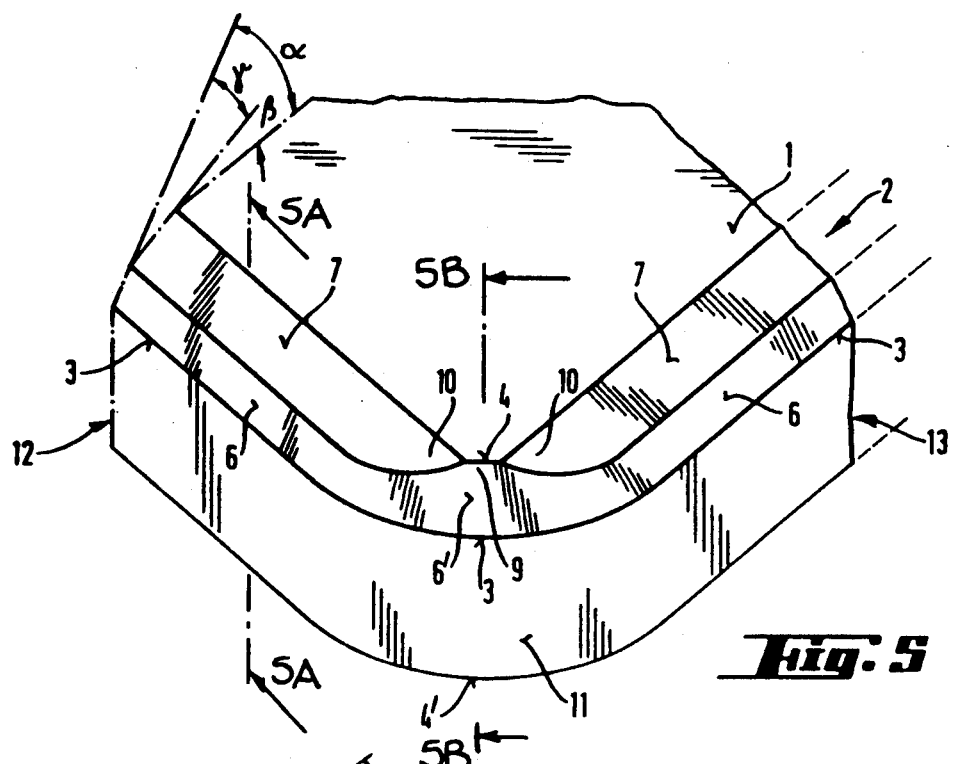
FIG. 5 represents a cutter insert with a reinforced corner area.

The cutter insert 2 is represented in FIGS. 1 to 5 as a plain cutter insert 2, not as a rotatable insert. It has a top surface 1, which is defined in FIGS. 1 and 1A by the circumferential, square cutting edge 3. At the corners the cutting edge 3 merges with the corner radius 4. By disposing a single protective bevel 5 on the cutter insert 2 the cutting edge 3 is displaced to a lower level, as represented in FIGS. 2 and 2A. If, as shown in FIGS. 3 and 3A, a double bevel is created, there will be a further downward displacement of the cutting edge 3, i.e., to the area where the primary bevel 6 meets the circumferential boundary surface 11 of the cutter insert 2.

FIG. 4 shows a special form of FIG. 2. Here the bevel in the area of the corner radius 4 is a TSD bevel, i.e., a truncoconical bevel 8.

Figure 5A:
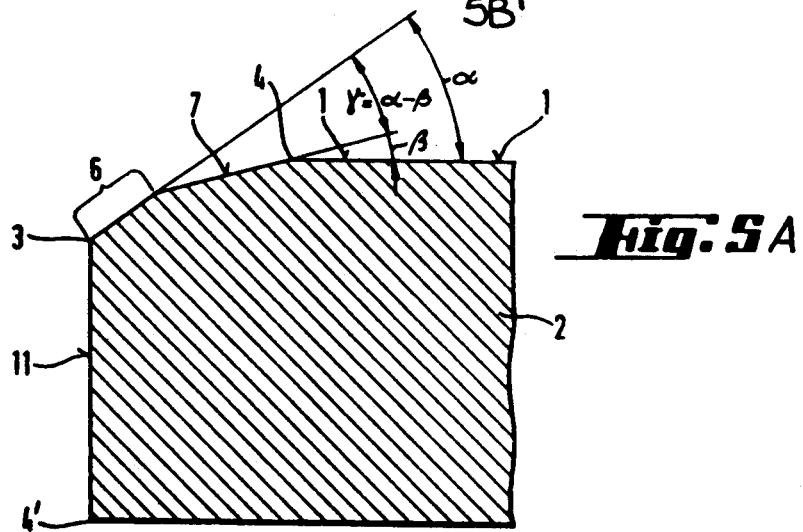
FIG. 5A represents an enlarged section along A-A.
Figure 5B:
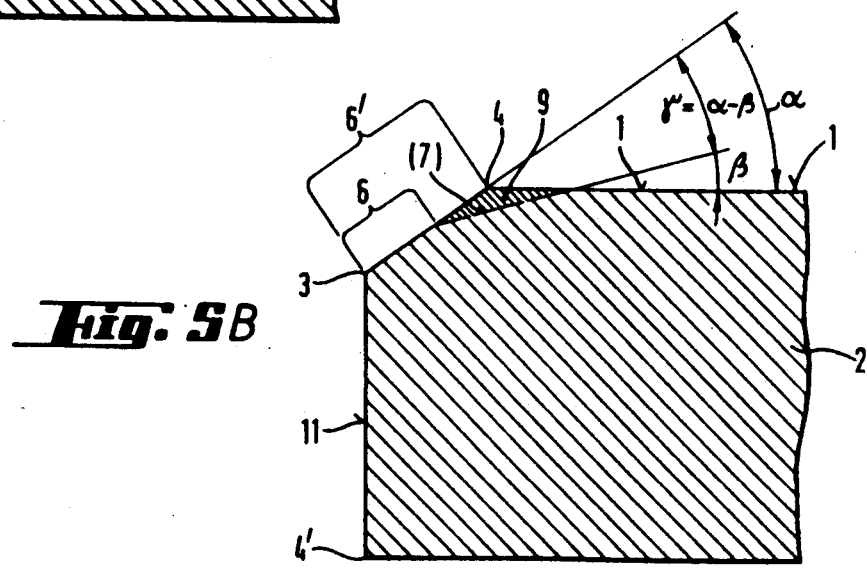
FIG. 5B represents an enlarged section along B-B.

FIGS. 5, 5A and 5B represent the construction in accordance with the invention. The straight sides 12, 13, which are part of the circumferential boundary surface 11, are adjoined by the secondary bevel 7 at an angle $\beta$ to the top surface 1 followed by the primary bevel 6 at an angle $\alpha$ to the top surface 1. The primary bevel 6 also follows the corner radius 4, 4'. The secondary bevel 7, however, runs straight, in accordance with the invention, from both directions toward the corner radius 4, and from there (straight bevel terminations 10) it no longer follows the primary bevel 6. Consequently, in the corner area 4, in contrast to the straight areas 12, 13, a strengthened area 9, represented in FIG. 5B as a closely hatched triangle 9, develops in the corner radius area 4, 4'. Thus, the primary bevel 6 of the straight areas 12, 13, is there carried by the strengthened area 9 to the corner radius area 4, 4', in the form of a strengthened primary bevel 6'.

The primary bevel 6' reaches from the cutting edge 3 to the uppermost boundary edge, now raised and simultaneously drawn forward, in the corner radius area 4, 4'.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Cutter insert for machining, especially a polygonal rotatable cutter insert with rounded cutter corners and a protective bevel configured as a double bevel running along the cutting edge, comprising:

a body having a top surface and a corner radius and having a double bevel comprising a flat primary bevel, except in the corner radius, with a width between 0.05 and 0.5 mm and an inclination $\alpha$ from the top surface between 20 and 35 degrees, and a flat secondary bevel, except in the corner radius, with a width between 0.5 and 3.0 mm and in inclination $\beta$ from the top surface of 5 degrees to 15 degrees, the primary and secondary bevels being at an angle $\gamma$ to one another, the secondary bevel terminating in the area of the corner radius in a strengthening area formed exclusively by the primary bevel.

2. Cutter insert in accordance with claim 1, in which the angle $\gamma$ amounts to 10 to 20 degrees.

3. Cutter insert in accordance with claim 1, in which the body has a cutter tip and a cutting edge having a middle and in which the secondary bevel diminishes continually in width from the cutter tip to the middle of the cutting edge.

4. Cutter insert in accordance with claim 1, in which the body has a rounded transition of the primary bevel in the corner radius.

* * * * *

UNITED STATES PATENT AND TRADEMARK OFFICE
CERTIFICATE OF CORRECTION

PATENT NO. : 5,006,020

DATED : April 9, 1991

INVENTOR(S) : Erwin Roos

It is certified that error appears in the above-identified patent and that said Letters Patent is hereby corrected as shown below:

Column 4, line 16 for "and in" read -- and an --.

Signed and Sealed this

Twenty-eighth Day of September, 1993

*Attest:*

BRUCE LEHMAN

*Attesting Officer*     *Commissioner of Patents and Trademarks*